United States Patent
Brassil

(10) Patent No.: US 7,143,166 B1
(45) Date of Patent: Nov. 28, 2006

(54) DYNAMIC BANDWIDTH ALLOCATION IN A RESERVATION SYSTEM

(75) Inventor: John Thomas Brassil, Los Gatos, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/351,597

(22) Filed: Jul. 12, 1999

(51) Int. Cl.
*G06F 15/173* (2006.01)
*H04N 7/173* (2006.01)

(52) U.S. Cl. ............... 709/226; 725/95; 370/329; 370/431; 370/458; 370/468

(58) Field of Classification Search ......... 709/226, 709/227, 234–236, 200; 370/329, 412, 458, 370/468, 395.21, 395.4, 431; 725/95
See application file for complete search history.

(56) References Cited

U.S. PATENT DOCUMENTS

| | | | | | |
|---|---|---|---|---|---|
| 5,917,822 | A | * | 6/1999 | Lyles et al. | 370/395.4 |
| 5,995,515 | A | * | 11/1999 | Suzuki | 370/465 |
| 6,351,461 | B1 | * | 2/2002 | Sakoda et al. | 370/335 |
| 6,434,117 | B1 | * | 8/2002 | Momona | 370/236 |

OTHER PUBLICATIONS

Errin W. Fulp and Douglas S. Reeves "Dynamic Bandwidth Allocation Techniques".
Ivy Hsu and Jean Walrand "Dynamic Bandwidth Allocation for ATM Switches" 33 J. Appl. Prob. 758-771 (1996).
Daniel Friedman, Sonjai Gupta, Chuanguo Zhang and Anthony Ephremides "Innovative Networking Concepts Tested on the Advanced Communications Technology Satellite" 14 Int'l J. Satellite Comm. 201-217 (1996).
Y. Afek, M. Cohen, E. Haalman, Y. Mansour "Dynamic Bandwidth Allocation Policies".

* cited by examiner

*Primary Examiner*—Frantz B. Jean

(57) ABSTRACT

In a reservation network designed to carry bursty traffic an improved dynamic bandwidth allocation method accounts for reservation latency. In one advantageous embodiment wherein the system is memoryless, a user will request its queue size divided by the reservation latency in the system. Alternatively, a small memory based system can achieve further efficiencies by making available to a user a frame length amount of memory. The user can then request the greater as between its queue size divided by the reservation latency and the number of current arrivals at the user.

12 Claims, 4 Drawing Sheets

| Time Instant | # of Arrivals | # of Slots from Headend | Queue Size | # of Slots Requested |
|---|---|---|---|---|
| t=0 | 0 | 0 | 12 | 12 |
| 1 | 0 | 0 | 12 | 12 |
| 2 | 0 | 0 | 12 | 12 |
| 3 | 0 | 12 | 0 | 0 |
| 4 | 0 | 12 | 0 | 0 |
| 5 | 0 | 12 | 0 | 0 |
| 6 | 0 | 0 | 0 | 0 |
| 7 | 0 | 0 | 0 | 0 |
| 8 | 0 | 0 | 0 | 0 |
| 9 | 0 | 0 | 0 | 0 |

*Number of Wasted Slots*     24

| Time Instant | # of Arrivals | # of Slots from Headend | Queue Size | # of Slots Requested |
|---|---|---|---|---|
| t=0 | 0 | 0 | 0 | 12 |
| 1 | 0 | 0 | 12 | 12 |
| 2 | 0 | 0 | 12 | 12 |
| 3 | 0 | 12 | 12 | 0 |
| 4 | 0 | 12 | 0 | 0 |
| 5 | 0 | 12 | 0 | 0 |
| 6 | 0 | 0 | 0 | 0 |
| 7 | 0 | 0 | 0 | 0 |
| 8 | 0 | 0 | 0 | 0 |
| 9 | 0 | 0 | 0 | 0 |

*Number of Wasted Slots* 24

FIGURE 2

| Time Instant | # of Arrivals | # of Slots from Headend | Queue Size | # of Slots Requested |
|---|---|---|---|---|
| t=0 | 0 | 0 | 0 | 4 |
| 1 | 0 | 0 | 12 | 4 |
| 2 | 0 | 0 | 12 | 4 |
| 3 | 0 | 4 | 12 | 3 |
| 4 | 0 | 4 | 8 | 2 |
| 5 | 0 | 4 | 4 | 0 |
| 6 | 0 | 3 | 0 | 0 |
| 7 | 0 | 2 | 0 | 0 |
| 8 | 0 | 0 | 0 | 0 |
| 9 | 0 | 0 | 0 | 0 |

*Number of Wasted Slots* 5

Figure 3

| Time Instant | # of Arrivals | # of Slots from Headend | Queue Size | # of Slots Requested |
|---|---|---|---|---|
| t=0 | 0 | 0 | 0 | 4 |
| 1 | 0 | 0 | 12 | 4 |
| 2 | 0 | 0 | 12 | 4 |
| 3 | 0 | 4 | 12 | 3 |
| 4 | 0 | 4 | 8 | 2 |
| 5 | 3 | 4 | 4 | 3 |
| 6 | 0 | 3 | 3 | 0 |
| 7 | 0 | 2 | 0 | 0 |
| 8 | 0 | 3 | 0 | 0 |
| 9 | 0 | 0 | 0 | 0 |

*Number of Wasted Slots*     5

*Figure 4*

DYNAMIC BANDWIDTH ALLOCATION IN A RESERVATION SYSTEM

FIELD OF THE INVENTION

The present invention relates to dynamic bandwidth allocation in a reservation system.

BACKGROUND OF THE INVENTION

Reservation system networks are well known in the art and have been studied in relation to various distribution systems, such as satellites and cable, for carrying various media, such as data, voice or video.

In its simplest form, a distribution network using a reservation system includes upstream, user to headend, and downstream, headend to user, channels. The headend broadcasts on the downstream channel the various time slots per time frame during which each respective user may communicate back to the headend. During its allocated time slot a particular user requiring a certain amount of bandwidth will send a request upstream for a reservation for an amount of bandwidth. The headend then responds to that user indicating that the requested bandwidth, or some fraction thereof has been reserved and may identify the time slot(s) corresponding to that bandwidth. A tree topology of such a prior art network, is shown in FIG. 1. As shown, N users are shown at 10 connected through a medium over which frames 30 of T time slots are transmitted to a headend 20.

As described above, available bandwidth over the network is dynamically allocated. The amount of bandwidth available to a user will vary depending in part on the user's requirements. Many existing systems, however, including some reservation systems, are static in that a predetermined amount of bandwidth is allocated and always available to each user on the distribution network. While this system is fair as between users, it may be a poor performer in terms of network efficiency. Often times it may occur that one user with a high demand will not have sufficient bandwidth, notwithstanding that the system as a whole is underutilized because another user is not at that time using all of the bandwidth reserved for its use. In addition, a static system is difficult to reconfigure when adding or removing users from the network.

Dynamic allocation of bandwidth can be more efficient than static allocation by accounting for the different needs of each user, at particular times. However, the system is not necessarily fair from a user point of view since heavy users can receive more bandwidth than relatively light users. While dynamic allocation schemes can be designed with greater degrees of complexity to achieve a fairer allocation, complexity introduces network latency, a concern described in more detail below.

A bandwidth allocation system simply takes user requests and assigns some feasible allocation of bandwidth. Dynamic (or adaptive) allocation algorithms vary the bandwidth allocated to each user based on online traffic measurement. Varying user allocations can extend the region of stability of user queues. A DBA Dynamic Bandwidth Allocation system can be designed so that any user is capable of capturing the entire shared link bandwidth, if desired. Under bursty traffic, the utilization of the shared upstream link can be higher, and users can see lower latency than for a static allocation. However, DBA algorithms must be carefully designed to avoid both short and long term unfair bandwidth sharing among users, relative implementation complexity, and slow responsiveness to sudden arrival bursts.

It should be noted that the implementation complexity of different bandwidth allocation algorithms can vary greatly. Complexity is shared by both users and the headend's bandwidth allocator. Indeed, the implementation of each algorithm requires partitioning functionality between the headend and the user node, as well as tradeoffs between this functionality and the encoding of the bandwidth requests and grants. One complexity measure useful in comparing different algorithms is the amount of information in an allocation request, and its encoding.

One typical type of dynamic allocation algorithm is referred to as state-based proportional, as the allocation is based on the user's state information. An example of useful user state is the current length of a user's queue. It is proportional in the sense that if there is insufficient bandwidth to satisfy all requests, a node will receive an allocation proportional to its request. Otherwise it will be allocated enough bandwidth to satisfy its request. This request embodies the composite "state" of user i at time t, and is typically chosen to be a function of user node parameters such as queue size and recent arrivals. Examples of request parameters include:

(i) Queue: A node requests enough slots to empty its queue in the current frame;

(ii) Prev: A node requests slots equaling a constant c>1 times the number of arrivals in the current frame;

(iii) Queue+Prev: A node requests slots equaling the sum of its queue plus the number of arrivals in the current frame. For a single frame reservation latency, this request forms an estimate of the allocation needed to empty the queue at the end of the next frame t+1; and (iv) Indicator: Each node signals an indication of the need for bandwidth in the current frame.

Depending on the type of distribution and the media being carried, dynamic or static allocation may be more appropriate. For example, static allocation may be more appropriate for voice communications since demand is fairly steady and its high quality requirement means bandwidth must be available. On the other hand, for media such as Internet traffic which is very bursty, a dynamic allocation may be more appropriate. Indeed, with Internet traffic, the network may experience fluctuations from high demand to no demand can occur from time frame to time frame.

Recently, a new network distribution medium is being promoted to bring a variety of media, including Internet access, directly to the house. This network is referred to as Fiber to the Home ("FTTH"). In accordance with the industry protocol Full Service Access Network ("FSAN"), being promoted for FTTH, a reservation system is employed over an optical network. Since FTTH is designed to include Internet traffic, it is important to design an effective method of dynamic allocation of bandwidth to handle the bursty traffic.

One common network design for FTTH is a passive shared-media optical distribution network. In this distribution system the upstream and downstream channels are logically separated with coarse-grain wavelength division multiplexing. The downstream broadcast channel uses optical power-splitting to permit communication from headend to all users. The upstream channel optically combines user transmissions. A fixed time-slot time division multiplexed algorithm ("TDMA") reservation protocol permits conflict-free access to the shared upstream link. The necessary slot time synchronization between users is achieved by extracting timing information from the shared downstream channel, coupled with an initial delay compensation procedure to logically set users at an equal distance from the optical signal combination point.

Time slots on the upstream link are organized into fixed length logical frames. In each upstream frame t each user transmits to the headend a request for time slots in a future frame. Typically, a slot (or minislot) is reserved for each user to issue an upstream bandwidth reservation request. After receiving and processing the N requests (the sum of all user's requests) transmitted upstream during frame t, the headend broadcasts downstream the slot reservations for each user in a future upstream frame t+δ, δ=1,2, etc. Hence, the parameter δ indicates the reservation latency in frames.

Reservation protocols of this type have been well studied in various settings including satellite systems and more recently in broadband residential access networks. One such protocol is Conflict-Free Multiple Access ("CFMA"), proposed for satellite-based systems. In CFMA each user node indicates a bid for bandwidth in a future frame by setting a bit in a dedicated TDM reservation minislot at the start of each frame. All frames are broadcast to all user nodes. Each user has a predetermined priority for capturing each time slot in a frame; an active bidder acquires all time slots for which it has highest priority among the other active bidders. See H. R. Hwa, "*A Framed Aloha System*," in Proc. PAC-NET Symposium (August 1975), hereby incorporated by reference as if fully set forth herein.

Thereafter, a centralized system was proposed where ground stations communicate queue length to an intelligent headend at the start of a frame; the headend allocates bandwidth and specific slots and broadcasts a future frame slot allocation (i.e. a 'grant') downstream. See S. Ng and J. W. Mark, "*A New Multi-Access Model for Packet Switching with an Intelligent Satellite*," in Proc. International Computer Communications Conference, (August 1976), hereby incorporated by reference as if fully set forth herein.

Returning to the issue of bandwidth allocation, latency, or delay in responding to a request can have an adverse impact on how efficient bandwidth is allocated, for the following reason. Consider a system where requests are based on queue length, as is traditionally the circumstance, with a delay of five frames. Typically, these systems are simply designed with no memory of prior requests. At frame t the user will simply transmit to the headend its queue length, which may be ten time slots. At time t+1 the user has not yet received a response, yet its queue length is still ten. In fact, the queue length may have grown. In either case the user will again send a request for at least the same ten time slots. The same is true at times t+2, t+3 and t+4. Consequently, five requests for the same ten time slots are sent. However, as soon as the first response is received the user will empty its queue, notwithstanding that it will receive ten time slots in each of the subsequent four frames. Those slots are wasted. The user was over allocated.

It may be possible to address the above scenario by adding memory to the user such that it will recognize when bandwidth was already requested for its queue. However, this introduces a degree of complexity in the system which will aggravate the latency of the system.

A collection of dynamic bandwidth allocation algorithms were recently introduced to address the support of IP traffic over a connection-oriented network. However, the focus of that study was the performance of algorithms for a single user, given essentially an unlimited amount of bandwidth available for allocation and a single frame reservation latency. See Y. Afek et al., "*Dynamic Bandwidth Allocation Policies*," in 2 IEEE Infocom '96 pp. 8808–887 (March 1996), hereby incorporated by reference as if fully set forth herein. However, the collection of algorithms do not support multiple users competing for finite bandwidth, with arbitrary reservation latency.

At present, network designers and those who consider issues relating to bandwidth allocation on real network systems, either ignore the effect of latency or address it only over long periods of time. There is no known method of dynamic bandwidth allocation that addresses latency over a very short period of time, for example, time frame by time frame. The bursty nature of Internet communication, however, requires a frame-level bandwidth allocation policy. It would thus be desirable to have a dynamic bandwidth allocation method which achieves high utilization of the shared upstream link, low headend processing complexity, fair bandwidth sharing between users, and low latency.

It should also be noted that with FSAN the issue of latency is aggravated by the fact that the speed of the upstream and downstream channels are mismatched. In other words, more than one request is sent upstream for every frame sent downstream.

SUMMARY OF THE INVENTION

Accordingly, it is desirable to have a method of dynamic bandwidth allocation, especially for use in connection with a FTTH distribution system, that addresses and reduces the effects of network latency. In accordance with the method of the present invention a state-based dynamic algorithm is scaled down by a factor equal to the reservation latency (measured in frames) in the system. Thus where queue length is the state parameter of the dynamic algorithm, the request is limited to the queue length divided by the reservation latency (frames).

Alternatively, where memory is available, the algorithm can be further modified in accordance with the present invention by requesting bandwidth based on both the demand in prior frames and the current demand.

BRIEF DESCRIPTION OF THE DRAWINGS

FIGS. 2–4 are tables, in which the rows represent successive time periods, and the columns indicate events occurring in the time periods.

DETAILED DESCRIPTION OF THE INVENTION

Figure 1:
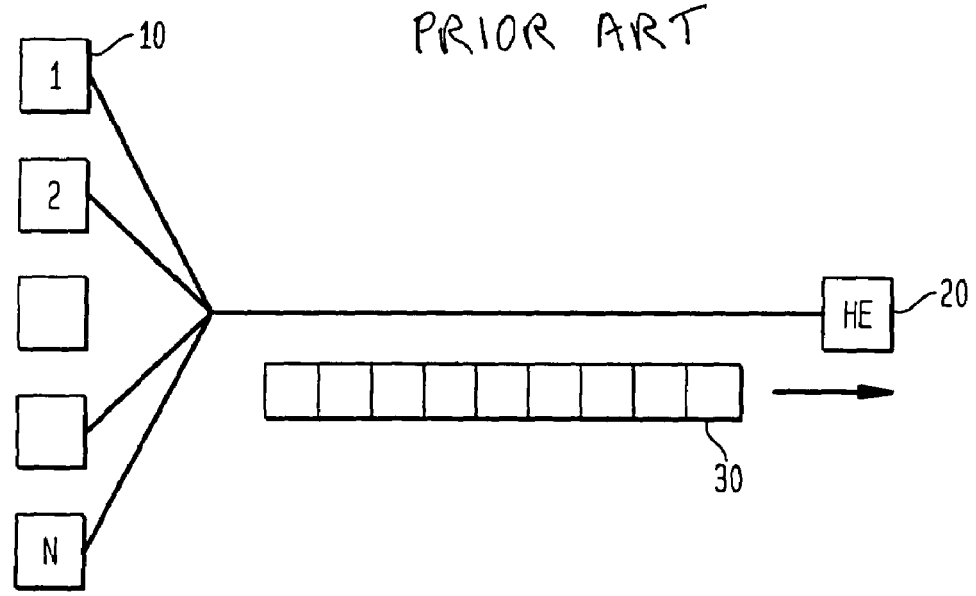
FIG. 1 depicts the topology of a prior art distribution network.

Throughout the following discussion it is assumed that each user has an infinite queue capacity, arrivals at each user's queue are of fixed size—an ATM cell—and exactly one cell can be transmitted in each time slot. Each upstream frame comprises T time slots for data traffic, and R reservation time slots, so the maximum utilization for best-effort data traffic is limited to T/(T+R). It is also assumed that the system is homogeneous, such that the same bandwidth allocation algorithm operates at each node.

To facilitate the following discussion the following variables for each user i are defined:

$\lambda_i^t$: The number of arrivals (ATM cells) to user i in frame t.

$\Phi_i^t$: The number of time slots requested by user i in frame t.

$\mu'^t_i$: The number of time slots allocated to user i in frame t.

$\mu_i^t$: The number of departures from user i in frame t.

$q_i^t$: The number of cells queued by user i at the end of frame t.

It follows that the size of user i's queue after t is equal to $q_i^{t-1}+\lambda_i^t-\mu_i^t$. Note that in a given frame a user's slot allocation might exceed its number of queued cells, and consequently exceed its actual departures. It follows then that the utilization of the data slots for the system is defined as $1/t(\Sigma_t\Sigma_i\mu_i^t/T)$. This however, does not include the reservation slot overhead, which is omitted from this discussion.

In accordance with the present invention a network designer can choose to accept higher delay to improve efficiency by modifying algorithms to be less aggressive than prior art methods described above, when in the face of reservation delay, $\delta$. Specifically, any state-based request by user i at time t should be modified to limit the total number of requested slots over a number of frames, to the reservation latency. Thus, a simple class of memoryless DBA algorithms can be written by scaling any of the bandwidth requests discussed above, i.e. queue, by a factor equal to the reservation latency. Thus for example, the request at time t may be set at $q_i^t/\delta$.

This less aggressive strategy maintains the overall efficiency near unity, the number of time slots used by all users at time t will be very close to the number of time slots allocated to all users at time t, with a relatively small increase in delay. It also has the potentially beneficial property of smoothing single frame arrival bursts over $\delta$ upstream frames.

In one advantageous embodiment of the present invention a slightly more aggressive request can be made where the system provides for a small amount of memory for each user, sufficient to store information about a user's state during the previous frame. In this system user i will request at time t, the greater value as between the number of arrivals at the user's queue $\lambda_i^t$, and $q_i^t/\delta$. This approach improves upon the responsiveness of simply requesting $q_i^t/\delta$, by immediately responding with a request equal to the number of cells in an arrival burst.

Referring to FIGS. 2–4 a very coarse illustration is shown of the difference in efficiency between the prior art method and the two embodiments of the present invention discussed above. In each of these charts a relationship is shown over 10 time instants, between the number of new arrivals to a user at that time instant, number of time slots available to that user at that time instant, the user's queue size at the end of that time instant and the number of requests sent to the headend by that user. For ease of illustration, it is assumed that each time instant corresponds to a frame period and that the reservation latency in the system is three time frames.

Referring to FIG. 2, the data reflects a dynamic algorithm in which the user always requests its queue size. No new arrivals appear to the user during the ten time instants being observed. However, the user begins with a queue size of 12. As is readily seen, with a reservation latency of three frames, the user makes three requests for 12 slots. However at t=3, 12 slots are delivered by the headends and the user's queue is empty. Nonetheless, the user continues to receive over the next two frames, a total of 24 unneeded slots.

In accordance with the present invention, FIG. 3 records that the user requests only ⅓ of its queue size. Therefore it begins to receive 4 slots at t=3 and continues to receive slots through t=7. However, instead of 24 wasted slots, there are only five. FIG. 4 demonstrates where a new arrival for three slots occurs at t=5. In accordance with the second embodiment of the invention, the user requests the greater of 3, or ⅓ of its queue size at the end of that time instant—which for FIG. 4 is ⅗ or 1. Thus the user requests 3 time slots. As shown in FIG. 4, after all requests are satisfied, only five time slots were wasted.

The foregoing merely illustrates the principles of the present invention. Those skilled in the art will be able to devise various modifications, which although not explicitly described or shown herein, embody the principles of the invention and are thus within its spirit and scope.

What is claimed is:

1. An improved dynamic bandwidth allocation method in a reservation system comprising one or more users and at least one headend, wherein one or more of said users request respective allocations of bandwidth based on a state parameter of said requesting user, said headend dynamically allocating bandwidth to one or more of said users in response to said respective requests, said headend responding to each of said requesting users with said allocated bandwidth, said response being delayed for a period of time which is a function of a reservation latency $\delta$ of said reservation system, said improvement comprising the step of scaling said request by a factor of $1/\delta$.

2. The method of claim 1 wherein said request equals the size S of a queue of a user divided by $\delta$, namely, S/$\delta$.

3. Apparatus for use with a headend node which allocates time slots on a channel to users, comprising:
   a) a user node which
      i) utilizes the channel, and
      ii) holds a queue of messages;
   b) means at the user node for
      i) ascertaining a number N of time slots required to handle the queue; and
      ii) requesting the headend node to allocate to the user node a fraction of the N time slots.

4. Apparatus according to claim 3, wherein the fraction equals 1/latency, wherein latency is an average delay time, measured in units of time slots, between (1) a request for an allocation and (ii) a grant of the request.

5. In a network wherein (1) nodes request allocations of time slots on a channel from an allocator, (2) a delay D exists between issuance of a request and resulting allocation, and (3) delays D can induce repetition of an initial request by a node and consequent multiple allocations in response to the initial request, thereby causing allocation of excessive time slots in response to the initial request, a method of operating a node comprising:
   a) ascertaining number N of time slots required to clear a queue standing at the node;
   b) making a first request for an allocation of fewer than N time slots from the allocator; and
   c) making a second request for an allocation of fewer than N time slots from the allocator.

6. Method according to claim 5, wherein the first and second requests ask for the same number of time slots.

7. Method according to claim 5, wherein the first and second requests ask for different numbers of time slots.

8. Method according to claim 5, wherein the delay D is measured in units of time slots and the first request is for N/D time slots.

9. An improved dynamic bandwidth allocation method in a reservation system comprising one or more users and at least one headend, wherein one or more of said users request respective allocations of bandwidth based on a state parameter of said requesting user, said headend dynamically allocating bandwidth to one or more of said users in response to said respective requests, said headend responding to each of said requesting users with said allocated bandwidth, said response being delayed for a period of time which is a function of a reservation latency $\delta$ of said reservation system, said improvement comprising the step of scaling said request by a factor of $1/\delta$, wherein each user a) determines two amounts, namely, i) a fraction of a queue held by the user and ii) number of arrivals of messages at the user at the time of request, and b) requests bandwidth equal to one of the amounts.

10. Method of claim 9, wherein the user determines whether one amount is larger than the other, and requests bandwidth equal to the larger.

11. Method of claim 10, wherein the determination of whether one amount is larger is done by a computer operated by the user.

12. Method of claim 9, wherein the determination of two amounts is done by a computer operated by the user.

* * * * *